(No Model.)
T. COCHRAN.
HEAD GEAR FOR CATTLE.
No. 416,441.  Patented Dec. 3, 1889.
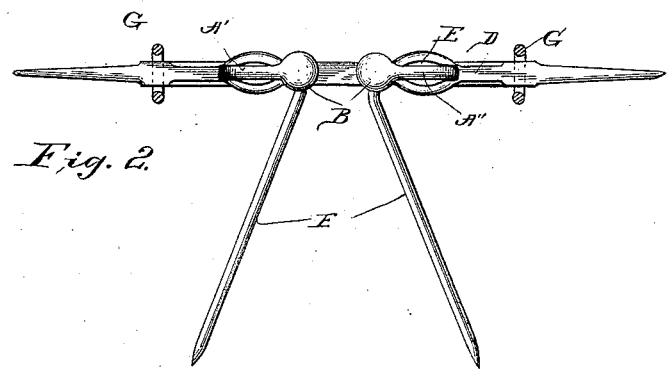
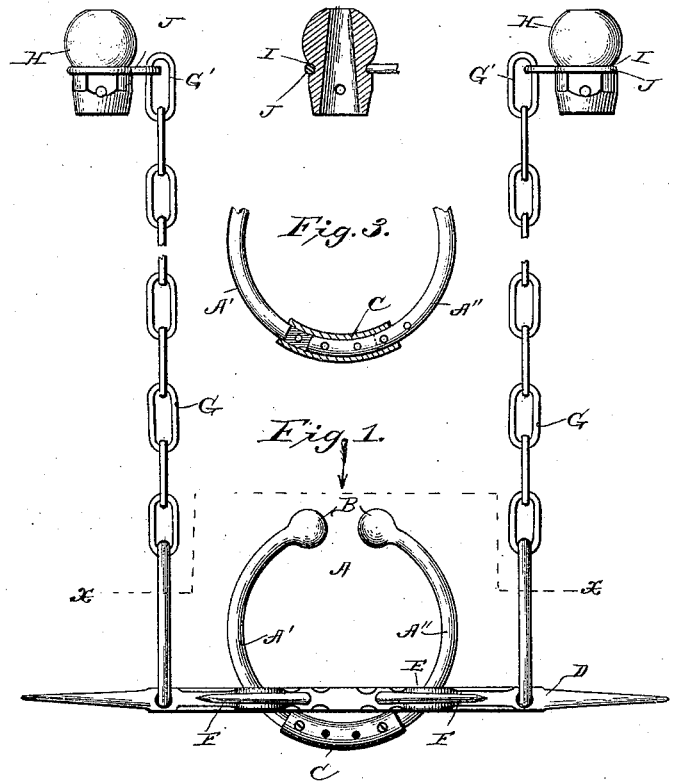
Witnesses
Inventor
Thomas Cochran

UNITED STATES PATENT OFFICE.

THOMAS COCHRAN, OF ST. CLAIRSVILLE, OHIO.

HEAD-GEAR FOR CATTLE.

SPECIFICATION forming part of Letters Patent No. 416,441, dated December 3, 1889.

Application filed July 29, 1889. Serial No. 319,035. (No model.)

*To all whom it may concern:*

Be it known that I, THOMAS COCHRAN, a resident of St. Clairsville, in the county of Belmont and State of Ohio, have invented certain new and useful Improvements in Head-Gear for Cattle; and I do hereby declare the following to be a full, clear, and exact description of the invention, such as will enable others skilled in the art to which it pertains to make and use the same.

The object of the invention is to supply means for preventing cattle from injuring with their horns persons and animals or fences and other property, and, further, to prevent them from sucking either themselves or other animals. These ends are attained by certain appliances that may be termed "head-gear," intended to be attached to the nose, or to the nose and horns, of the animal whose harmful tendencies are to be counteracted.

In the accompanying drawings, to which this specification refers, Figure 1 shows the entire apparatus seen from the front in approximately its position when upon the animal. Fig. 2 is a section on the line *x x*, Fig. 1, looking in the direction of the arrow. Fig. 3 is a view, partly in section, showing a portion of the nose-ring seen from the front, as in Fig. 1. Fig. 4 is an axial section of one of the knobs or tips to be mounted upon the horns of the animal.

In general terms, the apparatus consists of a ring for the nose of the animal, a bar pointed at each end and attached to the ring, spurs fixed in the bar, and chains connecting the end portions of the bar with knobs respectively upon the tips of the horns.

In the drawings, A is an incomplete ring, consisting of two preferably equal parts A' A", joined by halving and overlapping at one end, the overlapped parts being secured by an inclosing curved tube C and two screws passed through both the tube itself and the overlapped ends of the ring-segments. At their free ends both segments terminate in knobs B. Each segment of the ring passes through an aperture E in a straight bar D, pointed at each end, as shown. The apertures are equidistant from the middle of the bar, at a distance from each other less than the inner diameter of the ring, and are large enough to permit the free passage of the ring and to allow it some motion when in place. In the front of the bar, near its middle, are screwed two divergent spurs F, whose points, with the points of the bar itself, form a series approximately equidistant from each other and from the nose of the animal when the device is in position. The bar is perforated at some distance from each end, and in these peforations are secured, respectively, two chains G for connecting the bar with the horns of the animal. The first link in each chain is long enough to swing over the end of the bar, so that the latter may be reversed to compensate for wear, it being of course necessary to reverse the ring also. The second and last links of the chain are preferably not welded, but detachable, so that the length of the chain may be readily adjusted for each particular case where it is applied. The tips H for the horns have the usual axial bore of conical form, and the transverse aperture for a pin to secure them in position. They are also provided with an external annular groove I, in which closely fits a collar J. The last link G' of the chain is attached to this collar, and thus the chain has a swivel-like connection with the tip, that is much less likely to be broken loose than it would be were the collar rigidly fixed to the tip.

Now, when the ring is placed in the nose of an animal, the tips being secured upon the horns, the chains made of proper length, and the spurs being in place, it is evident that it is impossible for the animal to suck itself or another. So, too, if it be attempted to make improper use of the horns, pressure upon either of the chains causes the bar to be drawn against the nose and at the same time to act as a lever transmitting the force through the ring to the cartilage of the nose, thus speedily inducing the animal to desist.

When, as is often the case, use of the horns alone is to be guarded against, the spurs F may be unscrewed and removed, and where it is not desired to guard against the use of the horns the chains and tips may be dispensed with, though if the apparatus is to be worn for a considerable length of time the comfort of the animal will be increased by supporting the weight from the horns. When the animal is hornless, the upper portion of the apparatus is superfluous and is detached.

As shown, the ring-segments and the inclosing-tube are provided with a series of screw-holes, in order that the distance between the knobs B may be changed at will. In the case of large and vicious animals it is often desirable to perforate the septum of the nose and pass the ring through it, as the ring is both more secure and more effective. The ring may be readily adapted for this purpose by separating and reversing the segments, bringing the knobs in front of the bar, through which they cannot pass.

The sleeve is smooth and the screws are countersunk, so as not to project above its surface; hence the ring has for this latter use all the advantages of a solid ring, while at the same time it is capable of adjustment to clasp the septum in cases where perforation of the latter has has not been thought desirable.

What I claim as new, and desire to secure by Letters Patent, is—

1. The combination, with the ring composed of circular segments overlapped at one end, a smooth sleeve covering the overlapped ends, and countersunk screws passing through said sleeve and ends to secure them in position, of the bar crossing the ring and connecting the segments, whereby the same ring may at will be used to clasp the nose-septum or to pass through it.

2. The combination, with the separable nose-ring having knobs upon its free ends, of the spur-bearing bar provided with perforations allowing the body of the ring, but not the knobs, to pass therethrough, whereby the same apparatus may be used by passing the ring through the pierced nose-septum, or by causing the knobs to clasp said septum.

3. The combination, with the pointed bar having the slots for the passage of a ring, of the ring passed through said slots, and the chains secured to the bar upon opposite sides of the ring at some distance therefrom and adapted for attachment to the corresponding horns of an animal, whereby pressure upon one end of the bar or upon either chain causes the bar and ring to use the end of the nose as a fulcrum and act as a bent lever applying force to the nose-septum.

4. The combination, with the nose-ring and the bar attached thereto, of the tips for the horns, and the chains swiveled to the tips, respectively, and connecting them with the corresponding ends of said bar, substantially as set forth.

In testimony whereof I have signed this specification in the presence of two subscribing witnesses.

THOMAS COCHRAN.

Witnesses:
WALLACE GREENE,
B. J. McGINNIS.